(12) United States Patent
Simmons

(10) Patent No.: US 7,051,918 B2
(45) Date of Patent: May 30, 2006

(54) DUAL-BIASING WELD-ATTACHING OF END COMPONENTS TO AN ELONGATE ELEMENT

(76) Inventor: Robert J. Simmons, 27308 Fairview Ave, Hayward, CA (US) 94542

( * ) Notice: Subject to any disclaimer, the term of this patent is extended or adjusted under 35 U.S.C. 154(b) by 0 days.

(21) Appl. No.: 11/194,864

(22) Filed: Jul. 31, 2005

(65) Prior Publication Data

US 2006/0049237 A1    Mar. 9, 2006

Related U.S. Application Data

(63) Continuation of application No. 10/935,764, filed on Sep. 8, 2004.

(51) Int. Cl.
*B23K 5/22* (2006.01)
*B23K 31/02* (2006.01)
(52) U.S. Cl. ............... 228/212; 228/213; 228/47.1; 52/223.9
(58) Field of Classification Search ............... None
See application file for complete search history.

(56) References Cited

U.S. PATENT DOCUMENTS 2,376,574 A * 5/1945 Collins ............... 228/173.1
2005/0045693 A1* 3/2005 Buchheit et al. ......... 228/112.1

* cited by examiner

*Primary Examiner*—Lynne R. Edmondson
(74) *Attorney, Agent, or Firm*—Jon M. Dickinson PC; Robert D. Varitz PC

(57) ABSTRACT

A method utilizing a stabilizing jig structure for positioning and supporting the assembly of an elongate structural beam and a beam-end mounting component during weld attachment of that mounting component to an end of the beam. This method includes the steps of (a) applying, through a positionally shiftable first biasing element, a first yieldable biasing force which urges the beam-end mounting component relatively toward the associated beam end, and (b) applying, through a positionally shiftable second biasing element, a second yieldable biasing force which urges the beam-end mounting component relatively toward the first biasing element.

4 Claims, 1 Drawing Sheet

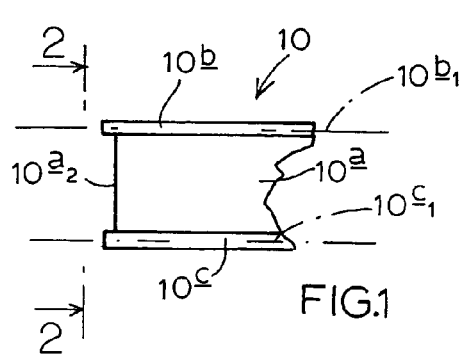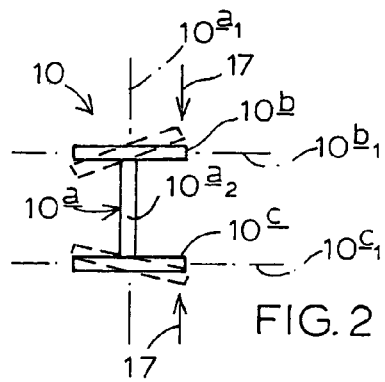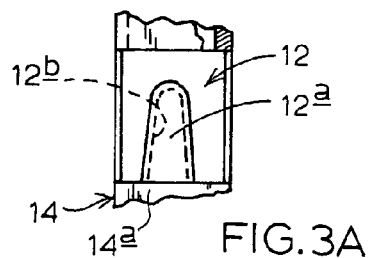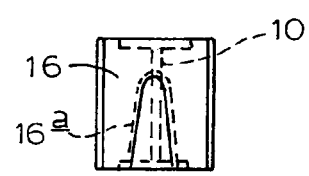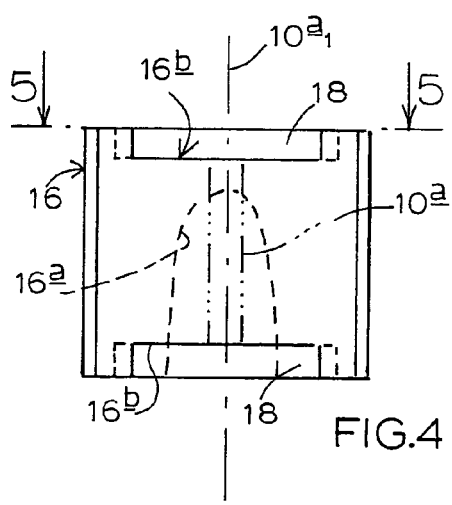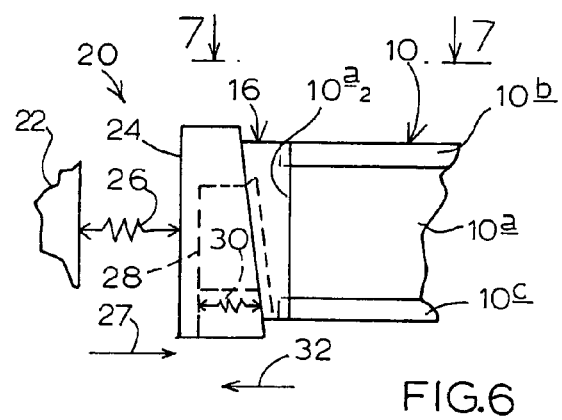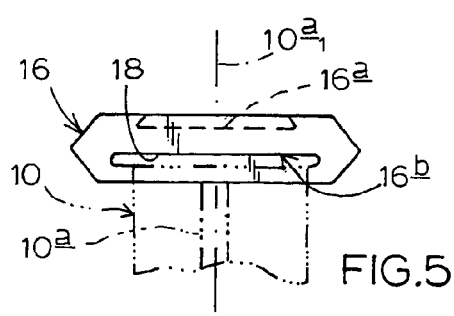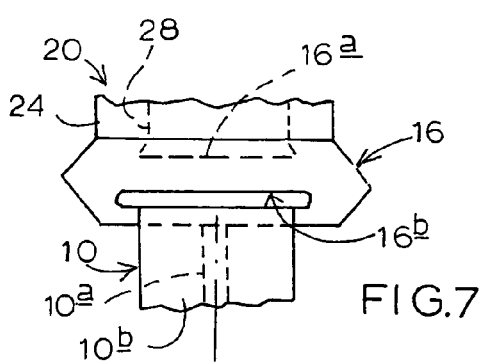

DUAL-BIASING WELD-ATTACHING OF END COMPONENTS TO AN ELONGATE ELEMENT

CROSS REFERENCE TO RELATED APPLICATION

This application is a continuation of U.S. patent application Ser. No. 10/935,764, filed Sep. 8, 2004 for "Method and Structure for I-Beam End Geometry Stabilization". Accordingly, this application claims the benefit of the filing date of that parent application, and hereby incorporates the entire disclosure of that prior application into this application by reference.

BACKGROUND AND SUMMARY OF THE INVENTION

This invention, referred to as dual-biasing, weld-attaching of end components to an elongate element, pertains to a method utilizing dual-spring biasing action for precisely positioning and supporting end mounting components which are to be welded to the opposite ends of an elongate I-beam (elongate element) in order to prepare that beam for attachment to the side of a column in a precision building frame structure. Dual-action spring biasing is specifically employed to urge the opposite ends of such a beam and a pair of beam-end mounting components tightly against one another during weld joining of such a beam ends and mounting components. The method of the invention also specially accommodates such positioning and supporting in a context which also allows for expected beam-length expansion during heat-generating welding. As will be seen, in the preferred practice of the present invention, both ends of a beam are dealt with simultaneously. It should be understood that, while the invention is specifically described and illustrated herein in relation to an elongate beam, there may be other settings wherein practice of the invention offers similar utility.

Thus, and for the purpose of illustration, a preferred and best-mode manner of practicing the invention, referred to also as a method associated with the attachment of a beam to a column utilizing a beam-end mounting component, is described in conjunction with a particular, collar-based, column/beam mounting, or interconnect, system with respect to which practice of this invention has been found to offer particular utility. This system is described in a prior-filed, currently pending U.S. patent application identified as Ser. No. 9/943,711, filed on Aug. 30, 2001 for "Moment-Resistant Building Frame Structure Componentry and Method". For background purposes only, the disclosure of this '711 patent application is hereby incorporated herein by reference. Component parts employed in this prior-application-disclosed interconnection system are illustrated and described herein to the extent useful in explaining the substance, and the principles of operation, of the present invention.

It is typical that horizontal beams employed in a structural, plural-story building frame are formed with an I-beam transverse cross-sectional footprint, or configuration. The present invention, which, as will become apparent, can be invoked with any beam "cross section", is specifically illustrated herein in the context of an I-beam configuration with respect to which it has been found to offer particular utility. Thus, specific reference herein to an I-beam should be understood to be reference also to other beam cross-sectional configurations with respect to which implementation of the present invention may have utility.

The invention is also described herein in the context of employing beam-end mounting components, during their weld-attachment to opposite beam ends, to stabilize the end cross section of a beam under circumstances where a certain amount of transverse, cross-sectional configuration-distortion may have occurred during beam fabrication. In the case of an I-beam, such deformation usually involves angulation of one or both flanges out of a designed and intended condition of right-angularity, or parallel planarity, relative to the beam's central web. It should be understood that while such stabilization provides a good environment for the description of the present invention, the invention per se is completely independent of the illustrative stabilization practice.

According to the preferred and best-mode manner of practicing the invention, provided at two spaced locations in a weld-enabling jig structure are two sets of moveable, first and second biasing elements which are adapted to receive and hold a pair of beam-end mounting components (one component per set). Collectively, the sets of first and second biasing elements, in what can be thought of as being their default, nominal positions in the jig structure, effectively define precise locations for receiving the opposite ends of an elongate I-beam with yet un-weld-attached beam-end mounting components fitted preliminarily onto the opposite beam ends. In each set of first and second biasing elements, the first biasing element is spring-biased in the jig structure toward a beam end through a fitted beam-end mounting component which is on that end, and the second biasing element is shaped to catch a portion of the beam-end mounting component, and is spring-biased to urge the beam-end mounting component toward the associated first biasing element.

These sets of first and second biasing elements thus define precise locations for the beam-end mounting components which are to be weld-attached to opposite ends of a beam, with the biasing springs which are associated with the first biasing elements accommodating beam-length extension due to the heat of welding.

As will be seen, the proposed sets of first and second biasing elements, along with their respective biasing springs, implement the methodology of the present invention in a very practical, simple and inexpensive way.

The various features and advantages of the invention will become more fully apparent as the detailed description which now follows is read in conjunction with the accompanying drawings.

DESCRIPTION OF THE DRAWINGS

FIG. 1 is a fragmentary side elevation of an end of an I-beam which is conventional except for the presence of a certain pre-weld, beam end preparation made to receive a beam-end mounting component in the practice of this invention.

FIG. 2 is a transverse cross-sectional view of the I-beam of FIG. 1, taken generally along the line 2—2 in FIG. 1. Solid lines in FIG. 2 show the proper design configuration intended for the transverse cross-sectional footprint of this beam, and dashed lines are employed, in an exaggerated manner, to illustrate a condition of possible initial, fabrication-created distortion/deformation which is appropriately handled during practice of the present invention.

FIGS. 3A and 3B present illustrations of the "mating faces", or sides, of precision column-side and beam-end collar-form interconnect components constructed in accordance with the disclosure of the above-referenced, prior-filed patent application, and provided herein to give an illustration of a particular setting wherein practice of the present invention offers special utility.

FIG. 4 is a view presented on a larger scale than that employed in FIG. 3B showing the prepared face (opposite the face shown in FIG. 3B) of a beam-end mounting component (the "beam attaching side") which has been readied to be welded to the end of a beam, such as that of the beam shown in FIGS. 1 and 2.

FIG. 5 is a view taken generally along the line 5—5 in FIG. 4.

In FIGS. 4 and 5, dash-triple-dot lines show an I-beam end joined to the illustrated beam-end mounting component.

FIG. 6 is a fragmentary, schematic side view specifically illustrating, at one end of an elongate beam, practice of the present invention involving utilizing a stabilizing jig, and associated, dual-action, spring-biased, first and second moveable biasing elements. What is illustrated in this figure for just one end of a beam is "mirrored" at the opposite end of the beam in the same stabilizing jig.

FIG. 7 is a view taken generally along the line 7—7 in FIG. 6, presented on a slightly larger scale than that employed in FIG. 6, and rotated 90° clockwise.

DETAILED DESCRIPTION OF THE INVENTION

As was mentioned and suggested earlier, the preferred and best-mode manner of practicing the present invention are described and illustrated herein with respect to a generally conventional, elongate I-beam, slightly modified at its opposite ends as will shortly be explained. It should be understood however, that while the description of the invention herein is presented in the context of an I-beam, and as was stated earlier herein, other types of beams may also easily be accommodated.

In FIGS. 1 and 2, an end of a "nearly" conventional, elongate I-beam is shown generally at 10. Use of the term "nearly" will shortly be explained. This beam includes a central web 10a, and substantially parallel planar upper and lower flanges 10b, 10c, respectively. Web 10a and flanges 10b, 10c are substantially planar, with the plane of web 10a being shown at $10a_1$, and the planes of flanges 10b, 10c being shown at $10b_1$, and $10c_1$, respectively. By intended design, plane $10a_1$ intersects planes $10b_1$, $10c_1$ at right angles.

In solid lines in FIG. 2, the intended design (correct) transverse cross-sectional configuration/footprint of beam 10 is shown. In dashed lines in FIG. 2, this configuration is seen to be distorted, or deformed, angularly in an exaggerated manner. This distortion generally illustrates the kinds of undesirable fabrication deformation which can exist in a conventionally acquired structural I-beam, and which is accommodated during practice of the present invention.

FIGS. 1 and 2 show, at $10a_2$, that, with respect to beam 10, an axially recessed region of central web 10a has been created. This recessed region, along with the resulting, axially "projecting" portions of the flanges, constitute as a defined male attaching portion in the illustrated end of beam 10. The opposite end (not shown) of beam 10 is prepared in the same fashion. It is because of the "preparation" thus shown at $10a_2$ that the term "nearly" was employed above this text.

Turning attention to FIGS. 3A and 3B, and recalling that the present invention is being described herein in the setting of the building-frame environment described in the above-mentioned '711 patent, shown in FIG. 3A is a beam-accommodating attaching component 12 which is illustrated in this figure suitably attached (as by welding) to a face 14a in a hollow and tubular, square cross section beam 14. Formed on that face of component 12 which faces the viewer in FIG. 3A is a male cleat 12a which projects toward the viewer, and which includes upper and lateral perimeter under-beveling, as indicated by a dashed line 12b.

Shown at 16 in FIG. 3B is a complementary beam-end mounting component which is to be secured, in accordance with practice of the present invention, to an end of a beam, such as to the end of beam 10 illustrated in FIGS. 1 and 2. It should be understood now that the description which follows in relation to the single beam end specifically illustrated herein is true also for the opposite end of the beam. Component 16, in the face of that component which confronts the viewer in FIG. 3B, includes a formed female recess 16a which is adapted, fully complementarily, to receive previously mentioned cleat 12a. It is through complementary interconnection between components 12, 16 that an end of a beam will be attached to a column, such as column 14.

Shown in dashed lines at 10 in FIG. 3B is the transverse cross-section, or footprint, of beam 10 illustrated as if attached to the far side of component 16 in FIG. 3B, with the long axis of the beam extending away from the viewer and generally normal to the plane of FIG. 3B. With component 16 attached to such a beam end, as will shortly be described, the associated beam will ultimately be attached to a column, such as column 14, through inter-engagement between component 16 and a component 12 (see FIG. 3A).

Turning attention now to FIGS. 4 and 5, here we see illustrated in somewhat greater detail beam-end mounting component 16, this time with (in FIG. 4) the side of that component to which a beam is to be attached facing the viewer. This side is the one that was referred to immediately above as the non-visible, or far, side of component 16 as such was pictured in FIG. 3B. In FIGS. 4 and 5, beam 10, with respect to its attached relationship to component 16, is generally pictured in dash-triple-dot lines.

Formed appropriately on and within that face of component 16 which faces the viewer in FIG. 4, and which faces downwardly in FIG. 5, are two removed-material, female regions 16b. These regions have the shapes clearly shown for them in these two figures, and as can be seen, regions 16b define appropriate reception shelves, or seats, intended to receive the projecting ends of flanges 10b, 10c in beam 10, with web 10a directly butting against component 16 along the facial region of that component which lies between regions 16b.

Prior to complementary fitment of a prepared beam end and a prepared beam-end mounting component, steps are taken to correct any incorrectness in the design end transverse cross section, or footprint, of a beam. In the case of an I-beam, such as I-beam 10, and in the event of fabrication-created deformation, or distortion, as illustrated in dashed lines in FIG. 2, suitable correction can be implemented, for example, by applying compressive clamping pressure to the "splayed" portions of flanges 10b, 10c (see arrows 17 the right sides thereof as pictured in FIG. 2) to bring the two flanges into proper parallel planarity, and into conditions with their nominal planes, $10b_1$, $10c_1$, at right angles to web plane $10a_1$. With this corrective action performed, and while proper transverse cross-sectional configuration is "held", the "corrected" beam end is fitted complementarily, snugly and "capturedly" with the female-prepared side of a beam-end mounting component.

With a beam 10 so positioned with respect to component 16, one will observe that, effectively, the transverse cross section, or footprint, of the beam is captured and locked against distortion in a transverse sense. Also, with a beam end thus properly poised relative to a beam-end mounting component 16, pockets of space generally shown at 18 exist for the creation in each of a molten weld pool during intended welding of the beam end to the beam-end mounting component. The presence and utility of regions 18 in component 16 are more fully described in another previously filed and currently pending U.S. patent application, Ser. No. 10/699,759, filed Nov. 3, 2003 by Robert J. Simmons for "Beam End Weld Preparation". While this weld-pool structure forms no part of the present invention, for background purposes in understanding what is shown in the figures in this application, the entire disclosure of that just-last-mentioned, prior-filed U.S. patent application is hereby incorporated herein by reference.

With a beam end thus weld-poised in the condition just described with respect to a beam-end mounting component 16, it is not possible that the transverse cross-section of the beam-end footprint will either (a) return to distortion, or (b) become newly transversely distorted, during welding attachment of that beam end to a beam-end mounting component.

FIGS. 6 and 7 illustrate schematically one way in which beam-end and beam-end mounting component weld attachment can be performed in accordance with practice of the present invention. Here, indicated fragmentarily and generally at 20 is jig structure which is useful for accomplishing this activity. Jig 20 includes a frame 22 on which is mounted a spring-biased, laterally shiftable (moveable) biasing element 24, also referred to herein as a first biasing element. Element 24 is biased by a biasing spring 26 which urges this element to the right in FIG. 6 relative to an appropriate nominal stop position in frame 22. This urging is generally indicated by an arrow, or direction vector, 27 in FIG. 6.

Carried for lateral reciprocal shifting (movement) on and with respect to element 24 is another shiftable (moveable) biasing element 28 (shown in dashed lines) called a second biasing element herein. Element 28 is urged by an appropriate biasing spring 30 generally in the direction of arrow, or direction vector, 32 (see FIG. 6) toward, and relative to, element 24.

As can be seen, vectors 27, 32 point in reverse directions. The respective biasing forces which are created by springs 26, 30 are referred to herein as yieldable biasing forces.

Describing one way of employing the present invention, and recognizing, as was mentioned earlier, that jig 20 deals simultaneously with both ends of a beam, with a beam's ends properly complementarily fitted (assembled) each with a beam-end mounting component 16, this assembly is brought into appropriate contact with the outwardly exposed portions of shiftable biasing elements 28 in jig 20. Biasing springs 30, acting on elements 28, create yieldable, spring-biased attractive forces which tend to hold the then-associated beam-end mounting components tightly against adjacent shiftable elements 24 in the jig. The exposed portions of elements 28 in jig 20 are shaped with appropriate male cleats, like previously mentioned cleat 12a, so as to accomplish and accommodate proper reception and complementary fitment (catching) of the female prepared outwardly facing sides of beam-end mounting components. Under these circumstances, biasing springs 26 act to urge shiftable biasing elements 24 against the assembly of the beam and beam-end mounting components to aid in stabilization.

In any suitable manner, which may either be performed under robotic computer control, or manually, appropriate welding takes place along the upper and lower sides of the flanges of the beam, and along the opposite sides of the beam's web, thus to weld-secure the opposite ends of the associated beam with the complementarily fitted beam-end mounting components. Heating of the beam ends, and of the associated beam-end mounting components, during welding produces effective, overall longitudinal expansion (lengthening) of the assembly of these structures. Thus, expansion is appropriately accommodated by yielding actions which take place in biasing springs 26.

It should be appreciated that there are many ways in which such dual-action, spring-biased weld-attaching may be performed, and the schematically illustrated jig structure fragmentarily pictured herein, and generally described, sets forth just one of such many, biasing-assisted attachment modalities. The precise construction of a jig, such as jig 20, forms no part of the present invention, and the details thereof, accordingly, have not been elaborated herein. Those persons generally skilled in the relevant art will readily understand that there are many specific successful ways in which to build a "jig 20" with sets of first and second moveable biasing elements, such as elements 24, 28, and associated biasing springs, such as springs 26, 30, respectively.

By practicing the present invention, and by implementing the several, above-described, very simple and relatively inexpensive steps, the process of weld-attaching beam ends and beam-end mounting components, like those illustrated and described herein, is very easily and precisely accomplished. The dual-biasing practice of this invention may also, of course, be employed in other kinds of similar weld-attachment situations.

Accordingly, while a preferred manner of practicing the present invention has been described and illustrated herein, it is appreciated that variations and modifications may be made without departing from the spirit of the invention, and all such variations and modifications are considered to be within the scope and spirit of the present invention.

I claim:

1. A method utilizing a stabilizing jig structure for positioning and supporting the assembly of an elongate structural beam having a long axis and a beam-end mounting component during weld attachment of that mounting component to an end of the beam, said method comprising
    applying, through a positionally shiftable first biasing element, a first, axially oriented, yieldable biasing force which urges the beam-end mounting component relatively toward the associated beam end, and
    applying, through a positionally shiftable second biasing element, a second, axially oriented, yieldable biasing force which urges the beam-end mounting component relatively toward the first biasing element.

2. The method of claim 1, wherein the two biasing forces have force vectors pointing in opposite directions.

3. The method of claim 1, wherein the yieldable biasing forces are implemented by biasing springs.

4. The method of claim 1 which, utilizing the mentioned jig structure, is applicable simultaneously to opposite ends of the mentioned beam.

* * * * *